US009391825B1

United States Patent
Beal et al.

(10) Patent No.: US 9,391,825 B1
(45) Date of Patent: Jul. 12, 2016

(54) SYSTEM AND METHOD FOR TRACKING SERVICE RESULTS

(75) Inventors: Jeff B. Beal, Edgewood, WA (US); Alan Stuart Robbins, Mercer Island, WA (US); Jeromey R. Goetz, Kent, WA (US); Brandon W. Porter, Auburn, WA (US); Grant A. M. McAlister, Seattle, WA (US); Joseph L. Ellsworth, Bainbridge Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 769 days.

(21) Appl. No.: 12/410,313

(22) Filed: Mar. 24, 2009

(51) Int. Cl.
G06F 15/16 (2006.01)
H04L 29/02 (2006.01)

(52) U.S. Cl.
CPC ...................................... *H04L 29/02* (2013.01)

(58) Field of Classification Search
CPC ....................................................... H04L 29/02
USPC ................................................. 709/224, 218
See application file for complete search history.

(56) References Cited

U.S. PATENT DOCUMENTS

| | | | |
|---|---|---|---|
| 5,809,121 A | 9/1998 | Elliot et al. | |
| 5,930,344 A | 7/1999 | Relyea et al. | |
| 6,585,776 B1 * | 7/2003 | Bates et al. | 715/206 |
| 6,640,241 B1 * | 10/2003 | Ozzie et al. | 709/204 |
| 6,675,153 B1 * | 1/2004 | Cook et al. | 705/74 |
| 6,742,030 B1 * | 5/2004 | MacPhail | 709/224 |
| 6,751,789 B1 * | 6/2004 | Berry et al. | 717/130 |
| 6,772,395 B1 * | 8/2004 | Hyman et al. | 715/234 |
| 6,973,459 B1 * | 12/2005 | Yarmus | 707/778 |
| 7,194,466 B2 * | 3/2007 | Chen et al. | |
| 7,209,548 B2 | 4/2007 | Ethier et al. | |
| 7,594,008 B2 * | 9/2009 | Toda et al. | 709/224 |
| 7,603,367 B1 | 10/2009 | Kanter et al. | |
| 7,680,850 B2 * | 3/2010 | Oda | 707/706 |
| 7,716,322 B2 * | 5/2010 | Benedikt et al. | 709/224 |
| 7,761,500 B1 * | 7/2010 | Eckert et al. | 709/203 |
| 7,774,335 B1 * | 8/2010 | Scofield et al. | 707/709 |
| 7,778,972 B1 * | 8/2010 | Cormie et al. | 707/626 |
| 7,831,548 B1 * | 11/2010 | Round et al. | 707/609 |
| 7,836,039 B2 * | 11/2010 | Clark et al. | 707/706 |
| 7,836,051 B1 * | 11/2010 | Mason | 707/734 |
| 2002/0007413 A1 * | 1/2002 | Garcia-Luna-Aceves et al. | 709/229 |
| 2002/0078014 A1 * | 6/2002 | Pallmann | 707/1 |
| 2002/0112036 A1 * | 8/2002 | Bohannon et al. | 709/220 |
| 2004/0267739 A1 * | 12/2004 | Dowling | 707/3 |
| 2005/0010653 A1 * | 1/2005 | McCanne | 709/219 |

(Continued)

*Primary Examiner* — Karen Tang
(74) *Attorney, Agent, or Firm* — Robert C. Kowert; Meyertons, Hood, Kivlin, Kowert & Goetzel, P.C.

(57) ABSTRACT

Various embodiments of a system and method for tracking service requests are described. Embodiments may include call tree generation logic configured to receive multiple request identifiers associated with a respective one of multiple service requests. Each given request identifier may include an origin identifier, a depth value, and a request stack comprising one or more interaction identifiers. The call tree generation logic may also be configured to, based on multiple request identifiers that each include an origin identifier associated with a particular root request, generating a data structure that specifies a hierarchy of services called to fulfill that particular root request. Based on one or more of the interaction identifiers and one or more of the depth values, the generated data structure may specify for each given service of the hierarchy: a parent service that called the given service, and one or more child services called by the given service.

24 Claims, 7 Drawing Sheets

(56) References Cited

U.S. PATENT DOCUMENTS

| | | |
|---|---|---|
| 2005/0138022 A1* | 6/2005 | Bailey et al. .................. 707/3 |
| 2005/0187905 A1* | 8/2005 | Dixon et al. .................. 707/3 |
| 2005/0198334 A1* | 9/2005 | Farber et al. ............... 709/229 |
| 2005/0210008 A1* | 9/2005 | Tran et al. .................. 707/3 |
| 2006/0085766 A1* | 4/2006 | Dominowska et al. ...... 715/854 |
| 2006/0265345 A1* | 11/2006 | Christian et al. ............ 707/1 |
| 2006/0277203 A1* | 12/2006 | Uittenbogaard ............ 707/100 |
| 2007/0055766 A1* | 3/2007 | Petropoulakis et al. ...... 709/224 |
| 2007/0055916 A1* | 3/2007 | Prang et al. .................. 714/47 |
| 2007/0266366 A1* | 11/2007 | Bucuvalas .................. 717/104 |
| 2008/0115047 A1* | 5/2008 | Petri ........................... 715/205 |
| 2008/0163160 A1* | 7/2008 | Bloesch et al. ............. 717/104 |
| 2008/0215755 A1* | 9/2008 | Farber et al. ............... 709/245 |
| 2009/0013083 A9* | 1/2009 | Garcia-Luna-Aceves et al. ........................... 709/229 |
| 2009/0132441 A1* | 5/2009 | Muller et al. ................ 706/11 |
| 2009/0228376 A1* | 9/2009 | Rollins et al. ............... 705/30 |
| 2010/0122178 A1* | 5/2010 | Konig et al. ................ 715/738 |
| 2012/0016959 A1* | 1/2012 | O'Laughlen et al. ........ 709/217 |

\* cited by examiner receiving multiple request identifiers each associated with a respective one of a plurality of service requests, where each given request identifier may include an origin identifier associated with a root request, a depth value specifying a location of the associated service request within a sequence of service requests, and a request stack including one or more interaction identifiers assigned to a service request issued from one service to another service
600 based on multiple ones of the request identifiers that each include an origin identifier associated with a particular root request, generating a data structure that specifies a hierarchy of services called to fulfill that particular root request; where, based on one or more of the interaction identifiers and one or more of the depth values, the generated data structure specifies for a given service of the hierarchy: a parent service that called the given service, and one or more child services called by the given service
602

*FIG. 6A* receiving a first request identifier associated with an inbound service request, the request identifier including an origin identifier associated with a root request, a depth value specifying a location of the inbound service request within a sequence of service requests, and a request stack including multiple interaction identifiers each assigned to a respective service request issued from one service to another service
650 generating a new request stack, wherein the new request stack comprises all of the interaction identifiers of the first request identifier except for an oldest one of the interaction identifiers, wherein the new request stack further comprises a new interaction identifier associated with an outbound service request
652 generating a second request identifier associated with the outbound service request, the second request identifier including: the origin identifier, a new depth value specifying a location of the outbound service request within the sequence of service requests, and the new request stack
652

*FIG. 6B*

SYSTEM AND METHOD FOR TRACKING SERVICE RESULTS

BACKGROUND

The Internet, sometimes called simply "the Net," is a worldwide system of computer networks in which a client at any one computer may, with permission, obtain information from any other computer. The most widely used part of the Internet is the World Wide Web, often abbreviated "WWW," which is commonly referred to as "the web." The web may be defined as all the resources (e.g., web pages and web sites) and users on the Internet that use the Hypertext Transfer Protocol (HTTP) or variations thereof to access the resources. A web site is a related collection of web files that includes a beginning file called a home page. From the home page, the user may navigate to other web pages on the web site. A web server program is a program that, using the client/server model and HTTP, serves the files that form the web pages of a web site to the web users, whose computers contain HTTP client programs (e.g., web browsers) that forward requests and display responses. A web server program may host one or more web sites.

Various applications of the Internet, and of the web, involve marketplaces that provide goods and/or services for sale. For instance, consumers may visit a merchant's website to view and/or purchase goods and services offered for sale by the merchant (and/or third party merchants). Some network-based marketplaces (e.g., Internet- or web-based marketplaces) include large electronic catalogues of items offered for sale. For each item offered for sale, such electronic catalogues typically include product detail pages (e.g., a web page) that specifies various information about the item, such as a description of the item, one or more pictures of the item, as well as specifications (e.g., weight, dimensions, capabilities) of the item. In various cases, such network-based marketplaces may rely on a service-oriented architecture to implement various business processes and other tasks.

BRIEF DESCRIPTION OF THE DRAWINGS

FIG. 6A illustrates a flowchart of an example method for the generation of a call tree data structure, according to some embodiments.

FIG. 6B illustrates a flowchart of an example method for the generation of a request identifier, according to some embodiments.

Figure 1:
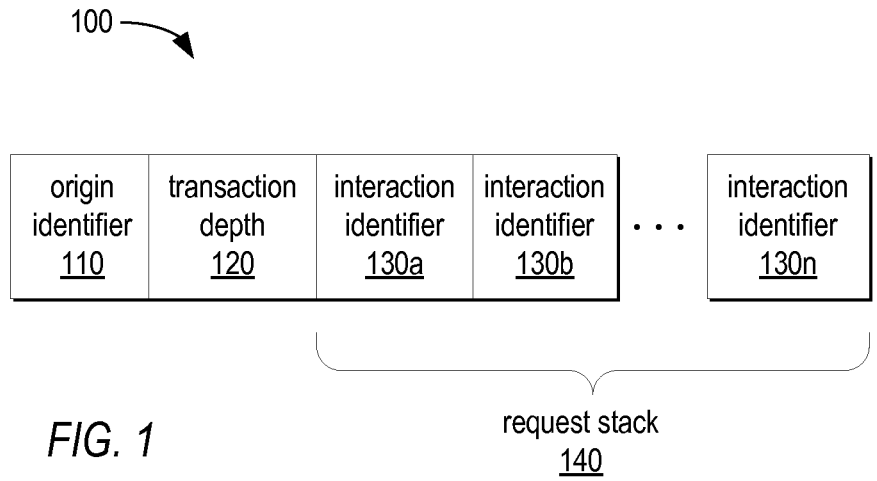
FIG. 1 illustrates an example format of a request identifier, according to some embodiments.

While the system and method for tracking service requests is described herein by way of example for several embodiments and illustrative drawings, those skilled in the art will recognize that the system and method for tracking service requests is not limited to the embodiments or drawings described. It should be understood, that the drawings and detailed description thereto are not intended to limit the system and method for tracking service requests to the particular form disclosed, but on the contrary, the intention is to cover all modifications, equivalents and alternatives falling within the spirit and scope of the system and method for tracking service requests as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Introduction

Various embodiments of a system and method for tracking service requests are described. The system and method for tracking service requests may include a framework for tracking a series of requests that propagate through a service-oriented system, such as a system structured according to a service-oriented architecture (SOA). Such a system may include multiple services configured to communicate with each other (e.g., through message passing) to carry out various tasks, such as business process functions. In some embodiments, such services may be loosely coupled in order to minimize (or in some cases eliminate) interdependencies among services. This modularity may enable services to be reused in order to build various applications through a process referred to as orchestration.

Service-oriented systems may be configured to process requests from various internal or external systems, such as client computer systems or computer systems consuming networked-based services (e.g., web services). For instance, an end-user operating a web browser on a client computer system may submit a request for data (e.g., data associated with a product detail page, a shopping cart application, a checkout process, search queries, etc.). In another example, a computer system may submit a request for a web service (e.g., a data storage service, a data query, etc.). In general, services may be configured to perform any of a variety of business processes.

The services described herein may include but are not limited to one or more of network-based services (e.g., a web service), applications, functions, objects, methods (e.g., objected-oriented methods), subroutines, or any other set of computer-executable instructions. In various embodiments, such services may communicate through any of a variety of communication protocols including but not limited to the Simple Object Access Protocol (SOAP). In various embodiments, messages passed between services may include but are not limited to Extensible Markup Language (XML) messages or messages of any other markup language or format. In various embodiments, descriptions of operations offered by one or more of the services may include Web Service Description Language (WSDL) documents, which may in some cases be provided by a service broker accessible to the services.

To process a given received request, the system described herein may invoke one or more of the types of services described above. As used herein, an initial request may be referred to as the "root request." In various embodiments, the root request may but need not originate from a computer system outside of the service oriented system described herein. In many embodiments, a root request may be processed by an initial service, which may then call one or more other services. Additionally, each of those services may also call one or more other services (and so on until the root request is completely fulfilled). Accordingly, the particular services called to fulfill a request may be represented as a "call tree" hierarchy that specifies, for each particular service of multiple services called to fulfill the same root request, the service that called the particular service and any services called by the particular service. For instance, a call tree hierarchy may in some cases be a deep and broad tree with multiple branches each representing a series of related service calls.

For clarity of description, various terms may be useful for describing elements of a call tree hierarchy. Note that the following terminology may only be applicable to services and requests of a given call tree hierarchy. In other words, the following terminology may only be applicable for services and requests associated with the same root request. From the perspective of a particular service, any service that calls the particular service may be referred to as a "parent service." Furthermore, from the perspective of a particular service, any service that the particular service calls may be referred to as a "child service." In a similar fashion, from the perspective of a particular request, any request from which the particular request stems may be referred to as a "parent request." Furthermore, from the perspective of a particular request, any request stemming from the particular request may be referred to as a "child request." Additionally, as used herein the phrases "request," "call," "service request" and "service call" may be used interchangeably. Note that this terminology refers to the nature of the propagation of a particular request throughout the present system and is not intended to limit the physical configuration of the services. As may sometimes be the case with service-oriented architectures employing modularity, each service may in some embodiments be independent of other services in the service-oriented system (e.g., the source code of services or their underlying components may be configured such that interdependencies among source and/or machine code are not present).

As described above, a given parent request may result in multiple child service calls to other services. In various embodiments of the system and method for tracking service requests, request identifiers embedded within such service calls (or located elsewhere) may be utilized to generate a stored representation of a call tree hierarchy for a given request. In various embodiments, such request identifiers may be stored in log files associated with various services. For instance, a service may store identifiers for inbound requests in an inbound request log and/or store identifiers for outbound requests in an outbound request log. In various embodiments, call tree generation logic may generate a representation of a call tree hierarchy from identifiers retrieved from such logs. Such representations may be utilized for diagnosing errors with request handling, providing developer support, and performing traffic analysis.

Request Identifiers

FIG. 1 illustrates an example format for a request identifier 100 of various embodiments. As described in more detail below, request identifiers of the illustrated format may be passed along with service requests. For instance, a service that calls another service may embed in the call an identifier formatted according to the format illustrated by FIG. 1. For example, a requesting service may embed a request identifier within metadata of a request. In various embodiments, embedding a request identifier in a service request may include embedding within the service request, information that specifies where the request identifier is located (e.g., a pointer or memory address of a location in memory where the request identifier is stored). The various components of the illustrated request identifier format are described in more detail below.

Origin Identifier— origin identifier (ID) 110 may be an identifier assigned to all requests of a given call tree hierarchy, which includes the initial root request as well as subsequent requests spawned as a result of the initial root request. For example, as described above, the service-oriented systems of various embodiments may be configured to process requests from various internal or external systems, such as client computer systems or computer systems consuming networked-based services. To fulfill one of such requests, the service-oriented system may call multiple different services. For instance, service "A" may be the initial service called to fulfill a request (e.g., service "A" may be called by an external system). To fulfill the initial request, service "A" may call service "B," which may call service "C," and so on. Each of such services may perform a particular function or quantum of work in order to fulfill the initial request. In various embodiments, each of such services may be configured to embed the same origin identifier 110 into a request of (or call to) another service. Accordingly, each of such requests may be associated with each other by virtue of containing the same origin identifier. As described in more detail below, the call tree generation logic of various embodiments may be configured to determine that request identifiers having the same origin identifier are members of the same call tree hierarchy.

The manner in which the origin identifier may be represented may vary according to various embodiments and implementations. One particular example of an origin identifier may include a hexadecimal string representation of a standard Universally Unique Identifier (UUID) as defined in Request for Comments (RFC) 4122 published by the Internet Engineering Task Force (IETF). In one particular embodiment, the origin identifier may contain only lower-case alphabetic characters in order to enable fast case-sensitive comparison of request identifiers (e.g., a comparison performed by the call tree generation logic described below). Note that these particular examples are not intended to limit the implementation of the origin ID. In various embodiments, the origin ID may be generated according to other formats.

Transaction Depth— transaction depth 120 may indicate the depth of a current request within the call tree hierarchy. For instance (as described above), service "A" may be the initial service called to fulfill a root request (e.g., service "A" may be called by an external system). To fulfill the initial request, service "A" may call service "B," which may call service "C," and so on. In various embodiments, the depth of the initial request may be set to 0. For instance, when the first service or "root" service receives the root service request, the root service (e.g., service "A") may set the transaction depth 120 to 0. If in response to this request the originating service calls one or more other services, the transaction depth for these requests may be incremented by 1. For instance, if service "A" were to call two other services "B1" and "B2," the transaction depth of the request identifiers passed to such services would be equivalent to 1. The transaction depth for request identifiers of corresponding requests sent by B1 and B2 would be incremented to 2 and so on. In the context of a call tree hierarchy, the transaction depth of a particular request may in various embodiments represent the distance (e.g., number of requests) between that request and the root request. For example, the depth of the root request may be 0, the depth of a request stemming from the root request may be 1, and so on. Note that in various embodiments, such numbering system may be somewhat arbitrary and open to modification.

The manner in which the origin identifier may be represented may vary according to various embodiments and implementations. One particular example of a transaction depth may be represented as a variable-width base-64 number. In various embodiments, the value of a given transaction depth may be but need not be a value equivalent to the increment of the previous transaction depth. For instance, in some embodiments, each transaction depth may be assigned a unique identifier, which may be included in the request identifier instead of the illustrated transaction depth 120.

Interaction Identifier(s)— interaction identifiers 130*a*-130*n*, collectively referred to as interaction identifier(s) 130, may each identify a single request (or service call) for a given call tree hierarchy. For instance (as described above), service "A" may be the initial service called to fulfill a request (e.g., service "A" may be called by an external system). To fulfill the root request, service "A" may call service "B," which may call service "C," and so on. In one example, the call of service "B" by service "A" may be identified by interaction identifier 130*a*, the call of service "C" by service "B" may be identified by interaction identifier 130*b* and so on.

Note that in various embodiments separate service requests between the same services may have separate and unique interaction identifiers. For example, if service "A" calls service "B" three times, each of such calls may be assigned a different interaction identifier. In various embodiments, this characteristic may ensure that the associated request identifiers are also unique across service requests between the same services (since the request identifiers include the interactions identifiers).

Note that in various embodiments the interaction identifier may be but need not be globally unique (e.g., unique with respect to all other interaction identifiers). For instance, in some embodiments, a given interaction identifier for a given request need be unique only with respect to request identifiers having a particular origin identifier 110 and/or a particular parent interaction identifier, which may be the interaction identifier of the request preceding the given request in the call tree hierarchy (i.e., the interaction identifier of the request identifier of the parent service). In one example, if service "A" were to call two other services "B1" and "B2," the request identifier of service "B1" and the request identifier of service "B2" would have separate interaction identifiers. Moreover, the parent interaction identifier of each of such interaction identifiers may be the interaction identifier of the request identifier associated with the call of service "A." The relationship between interaction identifiers and parent interaction identifiers is described in more detail below.

In various embodiments, interaction identifiers may be generated randomly or pseudo-randomly. In some cases, the values generated for an interaction identifier may have a high probability of uniqueness within the context of parent interaction and/or a given transaction depth. In some embodiments, the size of the random numbers that need to be generated depends on the number of requests a service makes.

Request Stack— request stack 140 may include one or more of the interaction identifiers described above. In various embodiments, the request stack may include the interaction identifier of the request to which the request identifier belongs. In some embodiments, the request stack may also include other interaction identifiers, such as one or more parent interaction identifiers of prior requests (e.g., a "stack" or "history" of previous interaction identifiers in the call tree hierarchy). In various embodiments, the request stack may have a fixed size. For instance, the request stack 140 may store a fixed quantity of interaction identifiers including the interaction identifier of the request to which the request identifier belongs and one or more parent interaction identifiers.

In various embodiments, the utilization of a request stack having a fixed length (e.g., fixed quantity of stored interaction identifiers) may provide a mechanism to control storage and bandwidth throughout the service-oriented system. For example, the service-oriented system of various embodiments may in some cases receive numerous (e.g., thousands, millions, or some other quantity) of services requests per a given time period (e.g., per day, per week, or some other time period), such as requests from network-based browsers (e.g., web browsers) on client systems or requests from computer systems consuming network-based services (e.g., web services). In some embodiments, a request identifier adhering to the format of request identifier 100 may be generated for each of such requests and each of any subsequent child requests. Due to the shear number of requests that may be handled by the service-oriented systems of various embodiments, even when the request stack of a single request identifier is of a relatively small size (e.g., a few bytes), the implications on storage and bandwidth of the overall system may in some cases be significant. Accordingly, various embodiments may include ensuring that each request identifier contains a request stack equal to and/or less than a fixed stack size (e.g., a fixed quantity of interaction identifiers). Similarly, various embodiments may include fixing the length of each interaction identifier stored as part of the request stack (e.g., each interaction identifier could be limited to a single byte, or some other size). By utilizing interaction identifiers of fixed size and/or a request stack of a fixed size, various embodiments may be configured to control the bandwidth and/or storage utilization of the service-oriented system described herein. For instance, in one example, historical request traffic (e.g., the number of requests handled by the service oriented system per a given time period) may be monitored to determine an optimal request stack size and/or interaction identifier size in order to prevent exceeding the bandwidth or storage limitations of the service-oriented system.

In various embodiments, the utilization of a request stack having a fixed length (e.g., fixed quantity of stored interaction identifiers) may provide a mechanism to control one or more fault tolerance requirements of the system including but not limited to durability with respect to data loss and other errors (associated with individual services and host systems as well as the entire service-oriented system). For example, in some embodiments, the larger the size of the request stack (e.g., the more interaction identifiers included within a given request identifier), the more fault tolerant the system becomes.

In embodiments where request stack 140 includes multiple interaction identifiers, the request stack may serve as a history of interaction identifiers. For instance, in the illustrated embodiment, interaction identifier 130*a*-130*n* may represent a series of interaction identifiers in ascending chronological order (where interaction identifier 130*a* corresponds to the oldest service call and interaction identifier 130*n* corresponds to the most recent service call).

In addition to the illustrated elements, request identifier 100 may in various embodiments include one or more portions of data for error detection and/or error correction. Examples of such data include but are not limited to various types of checksums.

Figure 2:
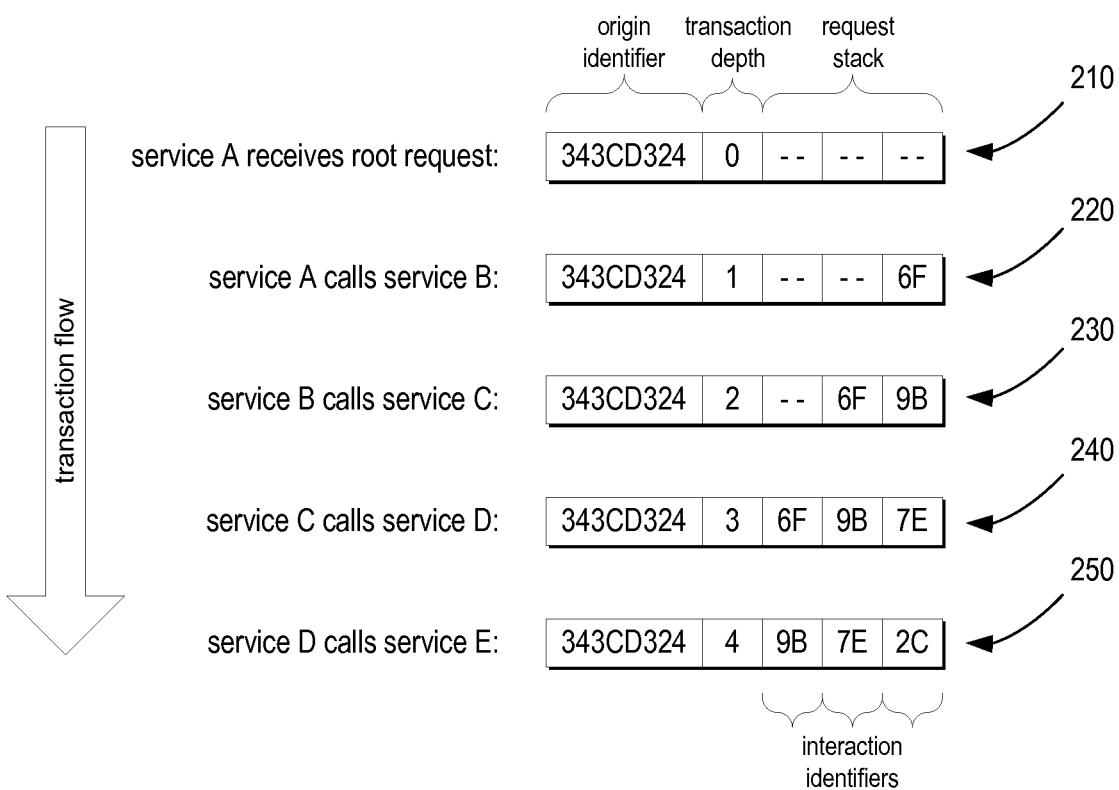
FIG. 2 illustrates an example transaction flow for fulfilling a root request, according to some embodiments.

FIG. 2 illustrates an example transaction flow for a root request and multiple child requests associated with the same root request. As illustrated, the transaction flow may begin with the receipt of a root request by service "A." For instance, this initial request might originate from a client computer system (e.g., from a web browser) or from another computer system requesting a service to consume. To completely fulfill the request, service "A" may perform some quantum of work and/or request the services of another service, such as service "B" (see e.g., request identifier 220). Service "B" may call another service "C" (see e.g., request identifier 230) and so on as illustrated (see e.g., request identifiers 240-250). As illustrated, since each request identifier 210-250 corresponds to a request of the same transaction, each of such request identifiers include the same origin identifier "343CD324." For instance, each of services A-D may embed such origin identifier within each of such request identifiers (described in more detail with respect to FIG. 3). Furthermore, in the illustrated embodiment, the request identifier corresponding to the initial service request includes a transaction depth of 0 since the request identifier is a parent request identifier, as described above. Each subsequent child request identifier includes a transaction identifier equivalent to the previous requests transaction depth plus an increment value. In other embodiments, instead of incremented values, the transaction depths may be values that uniquely identify a transaction depth with respect to other depths of a given call tree hierarchy; such values may but need not be increments of each other.

In the illustrated example, each request identifier 210-250 includes a request stack of a fixed size (e.g., three interaction identifiers). In other embodiments, larger or smaller request stacks may be utilized as long as the request stack includes at least one interaction identifier. Furthermore, in some embodiments, request stack sizes may be of uniform size across the service-oriented system (as is the case in the illustrated embodiment). However, in other embodiments, subsets of services may have different request stack sizes. For instance, a portion of the service-oriented system may utilize a particular fixed stack size for request identifiers whereas another portion of the service-oriented system may utilize another fixed stack fixed stack size for request identifiers.

Figure 3:
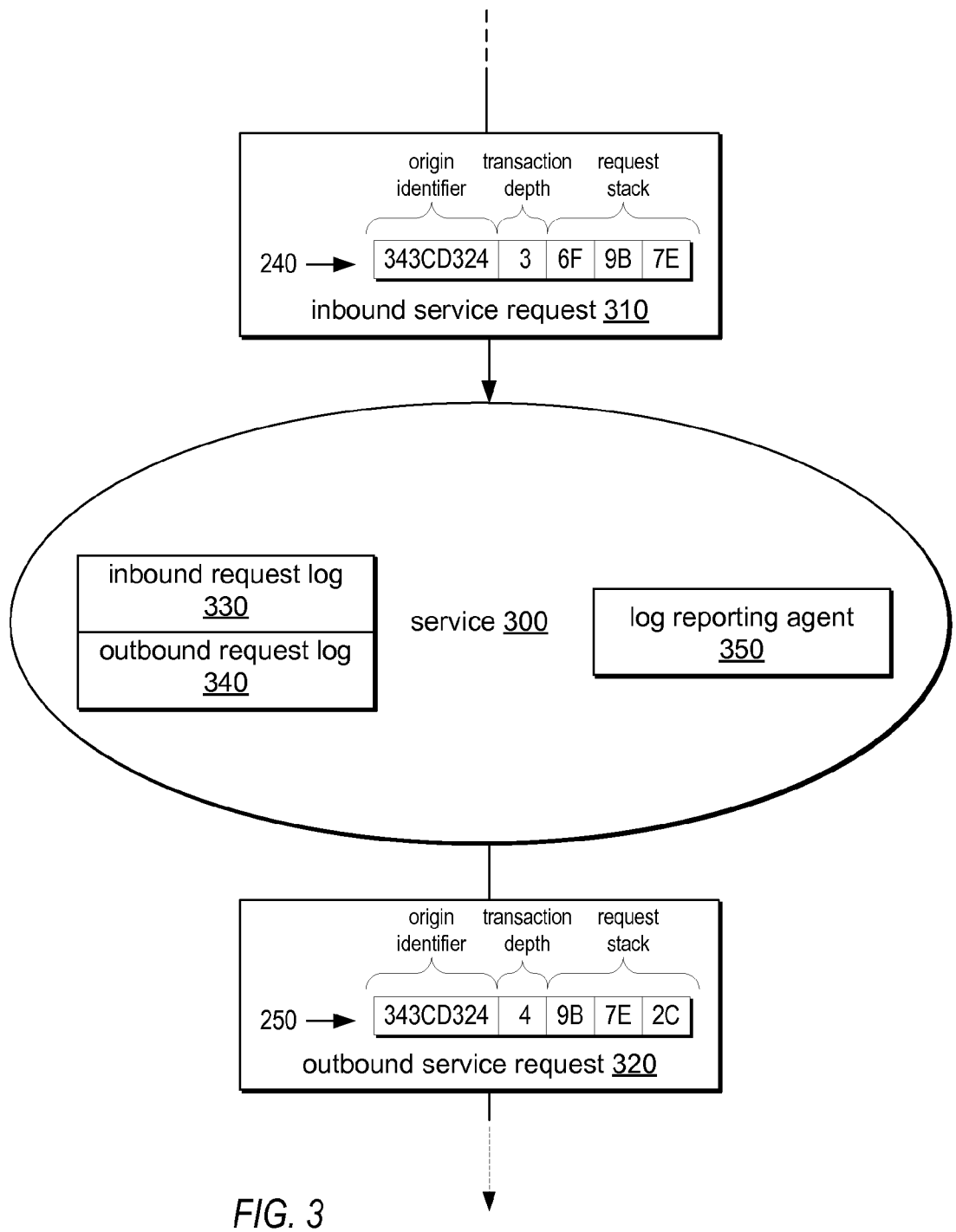
FIG. 3 illustrates one example of a service of a service-oriented system, according to some embodiments.

Referring collectively to FIG. 2 and FIG. 3, a representation of the receipt of an inbound service request (or service call) 310 as well as the issuance of an outbound request 320 by service 300 is illustrated. Request identifiers 240 and 250 of FIG. 3 may correspond to the like-numbered elements of FIG. 2. As illustrated, service 300 may receive an inbound service request 310. Service 300 may receive the inbound service request from another service within the service-oriented system, according to various embodiments. Inbound service request 310 may include the requisite instructions or commands for invoking service 300. In various embodiments, inbound service request 310 may also include a request identifier 240, which may include values for an origin identifier, transaction depth, and request stack, as described above with respect to FIG. 2. In various embodiments, request identifier 240 may be embedded within inbound service request 310 (e.g., as metadata). For example, according to various embodiments, the request identifier may be presented as part of metadata in a service framework, as part of a Hypertext Transfer Protocol (HTTP) header, as part of a SOAP header, as part of a Representational State Transfer (REST) protocol, as part of a remote procedural call (RPC), or as part of metadata of some other protocol, whether such protocol is presently known or developed in the future. In other embodiments, request identifier 240 may be transmitted to service 300 as an element separate from inbound service request 310. In various embodiments, request identifier 240 may be located elsewhere and inbound service request 310 may include information (e.g., a pointer or memory address) for accessing the request identifier at that location.

In response to receiving the inbound service request, service 300 may perform a designated function or quantum of work associated with the request, such as processing requests from client computer systems or computer systems requesting web services. In various embodiments, service 300 may be configured to store a copy of request identifier 240 within inbound log 330. In some cases, service 300 may require the services of another service in order to fulfill a particular request, as illustrated by the transmission of outbound service request 320.

As is the case in the illustrated embodiment, service 300 may be configured to send one or more outbound service requests 320 to one or more other services in order to fulfill the corresponding root request. Such outbound service requests may also include a request identifier 250 based at least in part on the received request identifier 240. Request identifier 250 may be generated by service 300 or some other component with which service 300 is configured to coordinate. Since outbound service request 320 is caused at least in part by inbound service request 310 (i.e., request 320 stems from request 310), the outbound service request 320 and the inbound service request 310 can be considered to be constituents of the same call tree hierarchy. Accordingly, service 300 (or some other component of the service-oriented framework) may be configured to generate request identifier 250 such that the request identifier includes the same origin identifier as that of the inbound service request 310. In the illustrated embodiment, such origin identifier is illustrated as "343CD324." For instance, in one embodiment, service 300 may be configured to determine the value of the origin identifier of the request identifier of the inbound service request and write that same value into the request identifier of an outbound service request. In various embodiments, service 300 (or some other component of the service-oriented framework) may also be configured to generate request identifier 250 such that the request identifier includes a transaction depth value that indicates the transaction depth level is one level deeper than the transaction depth of the parent request (e.g., inbound service request 310). For instance, in one embodiment, any given call tree hierarchy may have various depths that each have their own depth identifier. In some embodiments, such depth identifiers may be sequential. Accordingly, in order to generate request identifier 250 such that it includes a transaction depth value that indicates the transaction depth level is one level deeper than the transaction depth of the parent request (e.g., inbound service request 310), service 300 may be configured to determine the value of the transaction depth from the parent request, sum that value with an increment value (e.g., 1, or some other increment value), and store the result of such summation as the transaction depth value of the request identifier of the outbound service request. In the illustrated embodiment, the transaction depth value of the inbound request identifier 240 is 3 whereas the transaction depth value of the outbound request identifier 250 is 4.

In some cases, transaction depth identifiers may instead have identifiers that are not necessarily related to each other sequentially. Accordingly, in some embodiments, service 300 may be configured to determine the transaction depth value from the request identifier of the parent request. From that value, service 300 may determine the actual depth level corresponding to the transaction depth value (e.g., via a lookup table that provides a sequential listing of transaction depth levels to corresponding transaction depth values). From that depth level, service 300 may be configured to determine the next sequential transaction depth (e.g., via a lookup table that provides a sequential listing of transaction depth levels to corresponding transaction depth values) as well as the transaction depth value corresponding to that transaction depth. Service 300 may be configured to store such transaction depth value as the transaction depth value of the request identifier of the outbound service request.

Service 300 may also be configured to generate request identifier 250 of the outbound service request such that the request identifier has a request stack that includes an interaction identifier associated with the outbound service request and all of the interaction identifiers of the request stack of request identifier 240 except for the oldest interaction identifier, which in many cases may also be the interaction identifier corresponding to a request at the highest transaction depth level when compared to the transaction depth levels associated with the other interaction identifiers of the request stack. For example, the root request may occur at transaction depth "0," a subsequent request may occur at transaction depth "1," another subsequent request may occur at transaction depth "2," and so on. In some respects, the request stack may operate in a fashion similar to that of a first in, first out (FIFO) buffer, as described in more detail below.

To generate the request stack of request identifier 250, service 300 may be configured to determine the interaction identifiers present within the request stack of request identifier 240. Service 300 may also be configured to determine the size of the request stack that is to be included within request identifier 250 (i.e., the quantity of interaction identifiers to be included within the request stack). In some embodiments, this size may be specified by service 300, another service within the service-oriented system (e.g., the service that is to receive request 320), or some other component of the service-oriented system (e.g., a component storing a configuration file that specifies the size). In other embodiments, the size of the request stack may be specified by service 300. In one embodiment, the size of the request stack may be dynamically determined by service 300 (or some other component of the service-oriented system). For instance, service 300 may be configured to dynamically determine the size of the request stack based on capacity and/or utilization of system bandwidth and/or system storage. In one example, service 300 may be configured to determine that bandwidth utilization has reached a utilization threshold (e.g., a threshold set by an administrator). In response to such determination, service 300 may be configured to utilize a smaller request stack size in order to conserve bandwidth. In various embodiments, a similar approach may be applied to storage utilization.

Dependent upon the size of the inbound request stack and the determined size of the outbound request stack (as described above), a number of different techniques may be utilized to generate the request stack of request identifier 250, as described herein. In one scenario, the size of the inbound request stack may be the same as the determined size of the outbound request stack, as is the case in the illustrated embodiment. In this scenario, if the size of the outbound service request stack is to be n interaction identifiers, service 300 may be configured to determine the (n−1) most recent interaction identifiers of the request stack of the inbound request identifier. Service 300 may be configured to embed the (n−1) most recent interaction identifiers of the inbound request stack into the request stack of the outbound request identifier 250 in addition to a new interaction identifier that corresponds to request 320 issued by service 300. In the illustrated embodiment, for each request identifier, the oldest interaction identifier is illustrated on the leftmost portion of the request stack and the newest interaction identifier is illustrated on the rightmost portion. In the illustrated embodiment, to generate the request stack of the outbound request identifier, service 300 may be configured to take the request stack of the inbound request identifier, drop the leftmost (e.g., oldest) interaction identifier, shift all other interaction identifiers to the left by one position, insert a newly generated interaction identifier for the outbound request, and embed this newly generated request stack in the request identifier of the outbound request.

In another scenario, the size of the request stack of the inbound service request identifier 240 may be less than the size of the determined request stack size for the outbound service request identifier 250. In these cases, the request stack size of the outbound service request may enable all of the interaction identifiers of the request stack of the inbound service request identifier to be included within the request stack of the outbound service request identifier. Accordingly, in various embodiments, service 300 may be configured to embed all of the interaction identifiers in the request stack of the outbound request identifier 250 in addition to a new interaction identifier that corresponds to request 320 issued by service 300.

In an additional scenario, the size of the request stack of the inbound service request identifier 240 may be greater than the size of the determined request stack size for the outbound service request identifier 250. For instance, if the size of the request stack for the outbound service request identifier is m interaction identifiers and the size of the request stack for the inbound request identifier is m+x interaction identifiers (where x and m are positive integers), service 300 may be configured to determine the (m−1) most recent interaction identifiers of the request stack of the inbound request identifier. Service 300 may also be configured to embed such (m−1) most recent interaction identifiers of the request stack of the inbound request identifier into the request stack of the outbound request identifier in addition to a new interaction identifier that corresponds to request issued by service 300.

As described above, inbound request log 330 may be managed by service 300 and include records of one or more inbound service requests. In one embodiment, for each inbound service request received, service 300 may be configured to store that request's identifier (which may include an origin identifier, transaction depth, and request stack, as illustrated) within the inbound request log. In various embodiments, service 300 may also store within the log various metadata associated with each inbound service request identifier. Such metadata may include but is not limited to timestamps (e.g., a timestamp included within the request, such as a timestamp of when the request was generated, or a timestamp generated upon receiving the request, such as a timestamp of when the request was received by service 300), the particular quantum of work performed in response to the request, and/or any errors encountered while processing the request. In various embodiments, outbound request log 340 may include information similar to that of inbound request log 330. For example, for each outbound request issued, service 300 may store a record of such request within outbound request log 340. For instance, service 300 may, for each outbound request, store that request's identifier within outbound request log 340. As is the case with inbound request log 330, service 300 may also store within outbound request log 340 various metadata associated with requests including but not limited to metadata such as timestamps and errors encountered.

Log Data Collection

Figure 4:
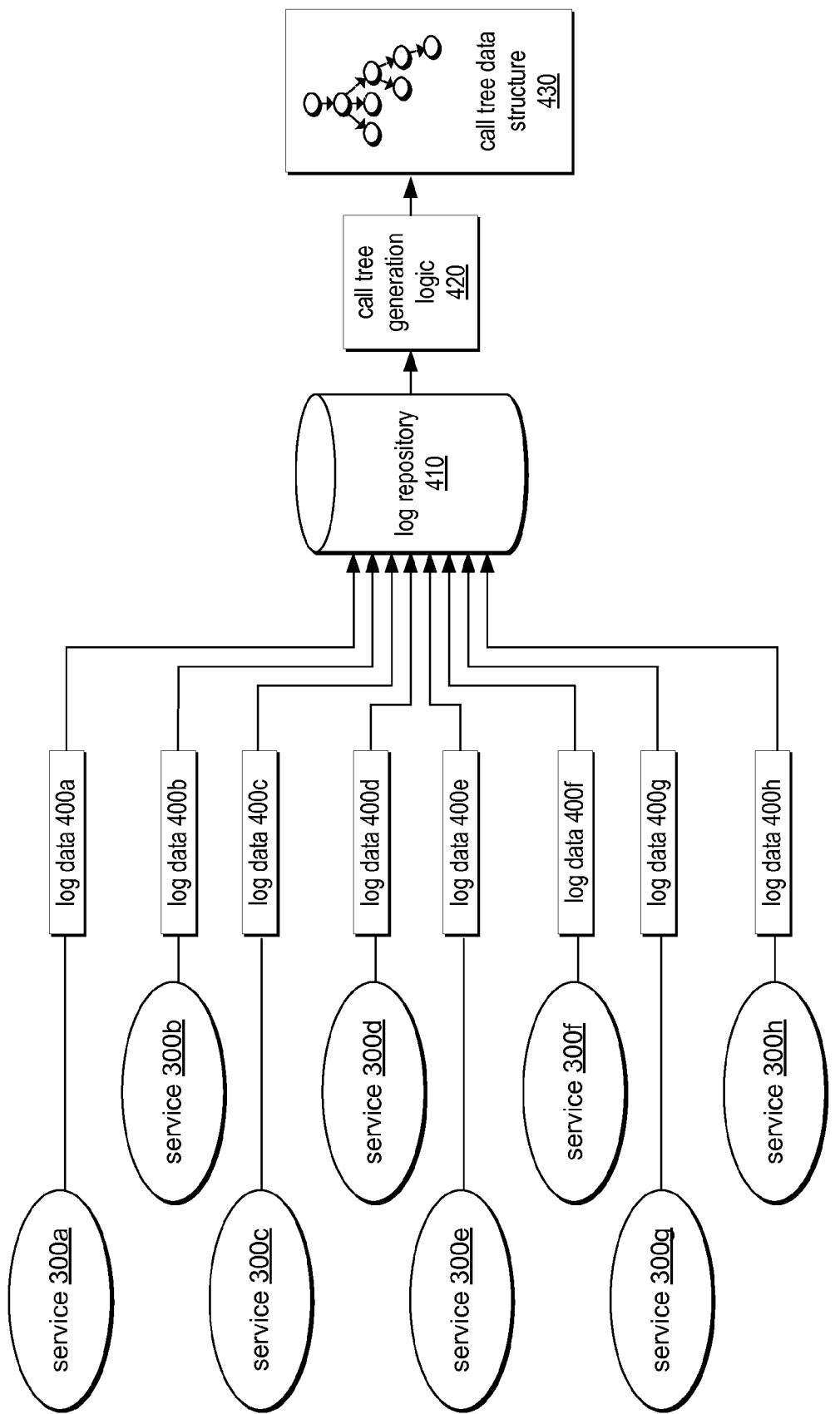
FIG. 4 illustrates an example data flow diagram for the collection of log data and generation of a call tree, according to some embodiments.

Referring collectively to FIG. 3 and FIG. 4, each service within the service-oriented system may include a log reporting agent, such as log reporting agent 350. Log reporting agent 350 may in various embodiments report the contents of inbound request log 330 and/or outbound request log 340 to a log repository (e.g., a data store, such as a database or other location in memory). One example of such a repository is illustrated log repository 410 of FIG. 4. Various protocols for transmitting records from the logs of a service 300 to a log repository may be utilized according to various embodiments. In some embodiments, the log reporting agent may periodically or aperiodically provide log information to the log repository. In various embodiments, the log reporting agent may be configured to service requests for log information, such as a request from the log repository or some other component of the service-oriented system. In some embodiments, in addition to or as an alternative to reporting log information from logs 330 and 340, log reporting agent 350 may report log information to the log repository in real-time (in some cases bypassing the storage of information within the logs altogether). For instance, as a request is detected or generated, the log reporting agent may immediately report the information to the log repository. In various embodiments, log data may specify, for each request identifier, the service that generated the request identifier and/or the service that received the request identifier.

Call Tree Generation

As illustrated in FIG. 4, multiple services 300a-300h within the service-oriented system may be configured to transmit respective log data 400a-400h to log repository 410. The data stored within log repository 410 (e.g., service request identifiers and associated metadata) may be accessed by call tree generation logic 420. Call tree generation logic may be configured to generate a data structure representing a call tree hierarchy, such as call tree data structure 430. As described above, the particular services called to fulfill a root request may be represented as a "call tree" hierarchy that specifies, for a particular service called, the service that called the particular service and any services called by the particular service. For instance, since a root request may result in a service call which may propagate into multiple other services calls throughout the service oriented system, a call tree hierarchy may in some cases be a deep and broad tree with multiple branches each representing a sequences of service calls.

Figure 5:
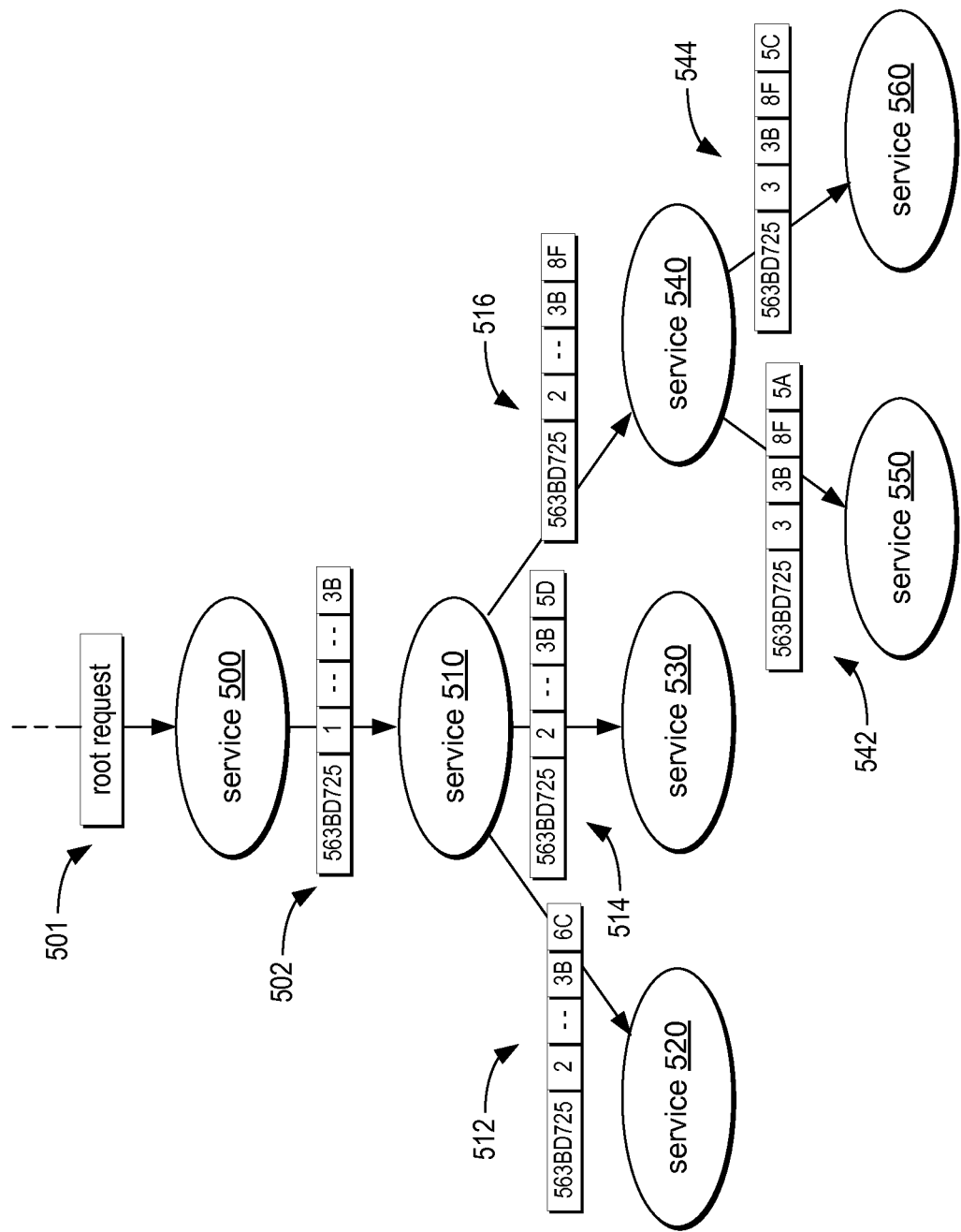
FIG. 5 illustrates an example visual representation of a call tree and request identifiers from which such call tree is generated, according to some embodiments.

FIG. 5 illustrates a visual representation of such a call tree data structure that may be generated by call tree generation logic 420. In various embodiments, a call tree data structure may include any data structure that specifies, for a given root request, all the services called to fulfill that root request. Note that while FIG. 5 and the associated description pertain to an acyclic call tree, this representation is not inclusive of all variations possible for such a call tree. For instance, in other embodiments, a call tree may be represented by any directed graph (including graphs that include directed cycles) dependent on the nature of the service requests within the service-oriented system. Additionally, for a given one of such services, the call tree data structure may specify the service that called the given service as well as any services called by the given service. The call tree data structure may additionally indicate a hierarchy level of a particular service within a call tree. For instance, in the illustrated embodiment, service 500 is illustrated as a part of the first level of the hierarchy, service 510 is illustrated as part of the second level of the hierarchy and so on.

To generate such a call tree, call tree generation logic may be configured to collect request identifiers (e.g., request identifiers 502, 512, 514, 516, 542 and 544) that each include the same origin identifier. In the illustrated embodiment, "563BD725" denotes an example of such an origin identifier. In various embodiments, call tree generation logic may mine (e.g., perform a search or other data analysis) log data associated with various services in order to find a collection of request identifiers that correspond to the same origin identifier (and thus correspond to the same root request, e.g., root request 501).

In various embodiments, inbound and outbound request logs may be maintained for each service. In these cases, call tree generation logic 420 may be configured to compare request identifiers in order to determine that a given service called another service in the process of fulfilling the root request. For example, in one embodiment, the call tree generation logic may compare a request identifier from a given service's outbound request log to the request identifier from another service's inbound request log. If a match is detected, the call tree generation logic may indicate that the service corresponding to that outbound request log called the service corresponding to that inbound request log. For example, call tree generation logic may discover a request identifier equivalent to request identifier 502 within the outbound request log associated with service 500. In this example, call tree generation logic may also locate a request identifier equivalent to request identifier 502 within the inbound log of service 510. In response to this match, call tree generation logic may indicate that an edge (representing a service call) exists between two particular nodes of the call tree (e.g., the node corresponding to service 500 and the node corresponding to service 510). The above described process may be repeated to determine the illustrated edges that correspond to request identifiers 512, 514, 516, 542 and 544. In other embodiments, since the manner in which interaction identifiers are generated may ensure that each interaction identifier is unique for a given depth level and origin identifier, the call tree generation logic may instead search for matching interaction identifiers between request identifiers of adjacent depth levels instead of searching for matching request identifiers.

In other embodiments, only one type of log (e.g., either inbound or outbound) may be maintained for a given service. For example, if only outbound request logs are maintained for each of the services, then the call tree generation logic 420 may utilize different techniques for determining an edge that represents a service call in the call tree data structure. In one example, call tree generation logic may compare two request identifiers that have adjacent depth values. For instance, in the illustrated embodiment, the call tree generation logic may be configured to compare request identifier 502 to request identifier 514, since such request identifiers contain the adjacent depth values of 1 and 2. In this case, the call tree generation logic may determine whether the most recent interaction identifier of request identifier 502 (e.g., 3B) is equivalent to the 2nd most recent interaction identifier of request identifier 514 (e.g., 3B). For request identifier 514, the 2nd most recent interaction identifier is evaluated since the most recent interaction identifier position will be fill with a new interaction identifier inserted by the service that generated request identifier 514 (in this case, service 530). In the illustrated embodiment, this comparison returns a match since the values for the interaction identifiers are equivalent. In response to such match, the call tree generation logic may be configured to indicate within the data structure that an edge (representing a service call) exists between service 500 and 510.

In various embodiments, the call tree generation logic 420 may be configured to generate a call tree in the presence of data loss. For instance, consider the case where the service oriented system maintains outbound service logs and the log data for service 510 is lost, as might be the case in the event of a failure on the host system on which service 510 runs or in the case of a failure of log repository 410. Since the request identifiers of various embodiments may include a request stack of multiple interaction identifiers, multiple layers of redundancy may be utilized to overcome a log data loss. In this example, since the outbound log data for service 510 is lost, request identifiers 512, 514, and 516 may not be available. Accordingly, the call tree generation logic may be configured to utilize a request identifier from a lower depth level to reconstruct the pertinent portion of the call tree. While request identifiers 512, 514, and 516 may be not be available due to data loss, the request identifier 542 (and 544) is available. Since request identifier 542 includes a stack or "history" of interaction identifiers, that request identifier may be utilized to obtain information that would have been available if request identifier 516 were not lost to data failure. Since request identifier 542 has a depth level that is two levels lower than the depth level of request identifier 502, the call tree generation logic may utilize the third most recent (not the second most recent as was the case in the previous example) interaction identifier. In this example, the third most recent interaction identifier is evaluated since that position would contain the interaction identifier generated by service 500 in the illustrated embodiment. If the call tree generation logic determines that the most recent interaction identifier of request identifier 502 matches the third most recent interaction identifier of request identifier 542, the call tree generation logic may determine that service 500 called service 510 even if the log data for service 510 is unavailable (e.g., due to data loss). Accordingly, the call tree generation logic may indicate an edge (representing a service call) exists between service 500 and service 510 within the generated call tree data structure.

Various metadata may also be included within such call tree data structure, such as timestamps, the particular quantum of work performed in response to a given request, and/or any errors encountered while processing a given request. For example, the illustrated services may record timestamps of when a request is received, when a request is generated, and/or when a request is sent to another service. These timestamps may be appended to the call tree data structure to designate latency times between services (e.g., by calculating the time difference between when a request is sent and when it is received). In other cases, metadata may include error information that indicates any errors encountered or any tasks performed while processing a given request. In some embodiments, such metadata may include host address (e.g., an Internet Protocol address of a host) in order to generate a tree structure that indicates which host machines are processing requests (note that in some embodiments host machines may host multiple different services).

The system and method for tracking service requests described herein may be configured to perform a variety of methods, an example of which is illustrated by FIG. 6A. The call tree generation logic described herein may be configured to perform the illustrated method, according to various embodiments. As illustrated, the method may begin with block 600, which may include receiving multiple request identifiers each associated with a respective one of multiple service requests. Each given request identifier may includes an origin identifier associated with a root request, a depth value specifying a location of the associated service request within a sequence of service requests, and a request stack including one or more interaction identifiers assigned to a service request issued from one service to another service. For example, receiving multiple request identifiers may in some cases include receiving log data that includes such request identifiers. For instance, the method may include receiving log data directly from host systems that host the services of the service-oriented system described herein. In some cases, the method may include receiving log data from one or more log repositories such as log repository 410 described above. In general, the method may include utilizing any of the techniques for obtaining request identifiers described above with respect to call tree generation logic 420.

As illustrated by block 602, the method may further include, based on multiple ones of the request identifiers that each include an origin identifier associated with a particular root request, generating a data structure that specifies a hierarchy of services called to fulfill that particular root request; wherein, based on one or more of the interaction identifiers and one or more of the depth values, the generated data structure specifies, for a given service of said hierarchy: a parent service that called the given service, and one or more child services called by the given service. For example, in various embodiments, generating the data structure may include determining that each of a subset of the multiple request identifiers includes the same origin identifier as well as indicating each associated service request as a node of the hierarchy within the data structure. Examples of such nodes are illustrated in FIG. 5 as services 500, 510, 520, 530, 540, 550 and 560. Generating such data structure may also include, for each node within the hierarchy, assigning the node to a level within the hierarchy based on the transaction depth value of the request identifier associated with the service request corresponding to that node. Examples of such depth level values are described above with respect to transaction depth 120 of FIG. 1. Generating the data structure may also include determining that the request stack of a given node at a given level within the hierarchy includes an interaction identifier that is the same as an interaction identifier of the request stack of an other node located within an adjacent level of the hierarchy. For instance, the method may include any of the various interaction identifier comparison techniques described above with respect to FIGS. 4 and 5. In response to determining such match, the method may include indicating a service call as an edge between said given node and said other node. Examples of such an edge are illustrated as the edges coupling the nodes of FIG. 5 described above.

In various embodiments, the techniques for analyzing request identifiers and generating a call tree may be performed on an incremental basis. For example, as request identifiers are updated (e.g., as logs and/or log repositories receive new data), the call tree generation logic described herein may be configured to incrementally update the generated call tree data structure to reflect the newly reported requests. In some embodiments, the techniques described herein may be performed on a depth level basis. For example, as request identifiers are received (e.g., by the log repository or call tree generation logic described herein), each identifier may be categorized (e.g., placed in a categorized directory) based on transaction depth.

In various embodiments, the generated call tree data structures described herein may be utilized for diagnostic purposes. For instance, as described above, the call tree data structure may include metadata, such as a record of error(s) that occur when processing a request. Since this metadata may be associated with specific nodes and/or service calls, various embodiments may include determining sources of errors or faults within the service oriented system. In some embodiments, the generated call tree data structures described herein may be utilized for analytical purposes. For example, based on call tree data structures generated as described herein, various embodiments may include determining historical paths of service calls and/or path anomalies. For instance, various embodiments may include detecting that, for a given root request, one or more services are being called unnecessarily. For instance, such services may not be needed to fulfill the particular root request. Accordingly, in some embodiments, such services may be culled from processing further requests similar to or the same as the root request that originally initiated the unnecessary service calls (e.g., a re-orchestration process may be employed to modify the particular services called for a particular type of request). By removing such unnecessary service calls, various embodiments may conserve resources such as storage and/or bandwidth. In other embodiments, the generated call tree data structures described herein may be utilized for auditing purposes. For example, in the case that the service oriented system provides network-based services (e.g., web services) to consumers of such services (who may provide remuneration for the consumption of services), such consumers may desire to at least occasionally view information that confirms they are being charged in a fair manner. To provide such information to the consumer, various embodiments may include providing the consumer with various records such as records that indicate how frequent they consume network-based services and in what quantity. Such information may be generated based on the call tree data structures described herein.

FIG. 6B illustrates a flowchart of an example method for generating a given request identifier. In various embodiments, any of the services described herein may be configured to perform the illustrated method (e.g., service 300 of FIG. 3). As illustrated by block 650, the method may include receiving a first request identifier associated with an inbound service request. The request identifier may include an origin identifier associated with a root request, a depth value specifying a location of the inbound service request within a sequence of service requests, and a request stack including multiple interaction identifiers each assigned to a respective service request issued from one service to another service of multiple services. One example of receiving such a request identifier is illustrated in FIG. 3 as the receipt of inbound service request identifier 240 by service 300.

As illustrated by block 652, the method may also include generating a new request stack. The new request stack may include all of the interaction identifiers of the first request identifier except for an oldest one of the interaction identifiers. For instance, as illustrated in FIG. 3, the request stack of outbound request identifier 250 does not include "6F," which is the oldest interaction identifier of the inbound service request identifier 240. The new request stack may also include a new interaction identifier associated with an outbound service request. For instance, as illustrated in FIG. 3, the request stack of outbound service request identifier 250 includes a new interaction identifier "2C."

As illustrated by block 654, the method may also include generating a second request identifier associated with the outbound service request. The second request identifier may include the origin identifier, a new depth value specifying a location of the outbound service request within the sequence of service requests, and the new request stack. One example of such a second request identifier is illustrated as outbound service request identifier 250 of FIG. 3.

In various embodiments, the method may also include generating the new depth value such that the new depth value is a result of incrementing the first depth value. For example, in the illustrated embodiment of FIG. 3, the depth value of the outbound request identifier (i.e., "4") may be the result of incrementing the depth value of the inbound request identifier (i.e., "3"). In various embodiments, the method may include storing either of (or both of) the first request identifier and the second request identifier as log data accessible to one or more computer systems. For instance, in the illustrated embodiment of FIG. 3, the inbound and outbound request identifiers may be stored in inbound request log 330 and outbound request log 340, respectively.

Example System Configurations

Figure 7:
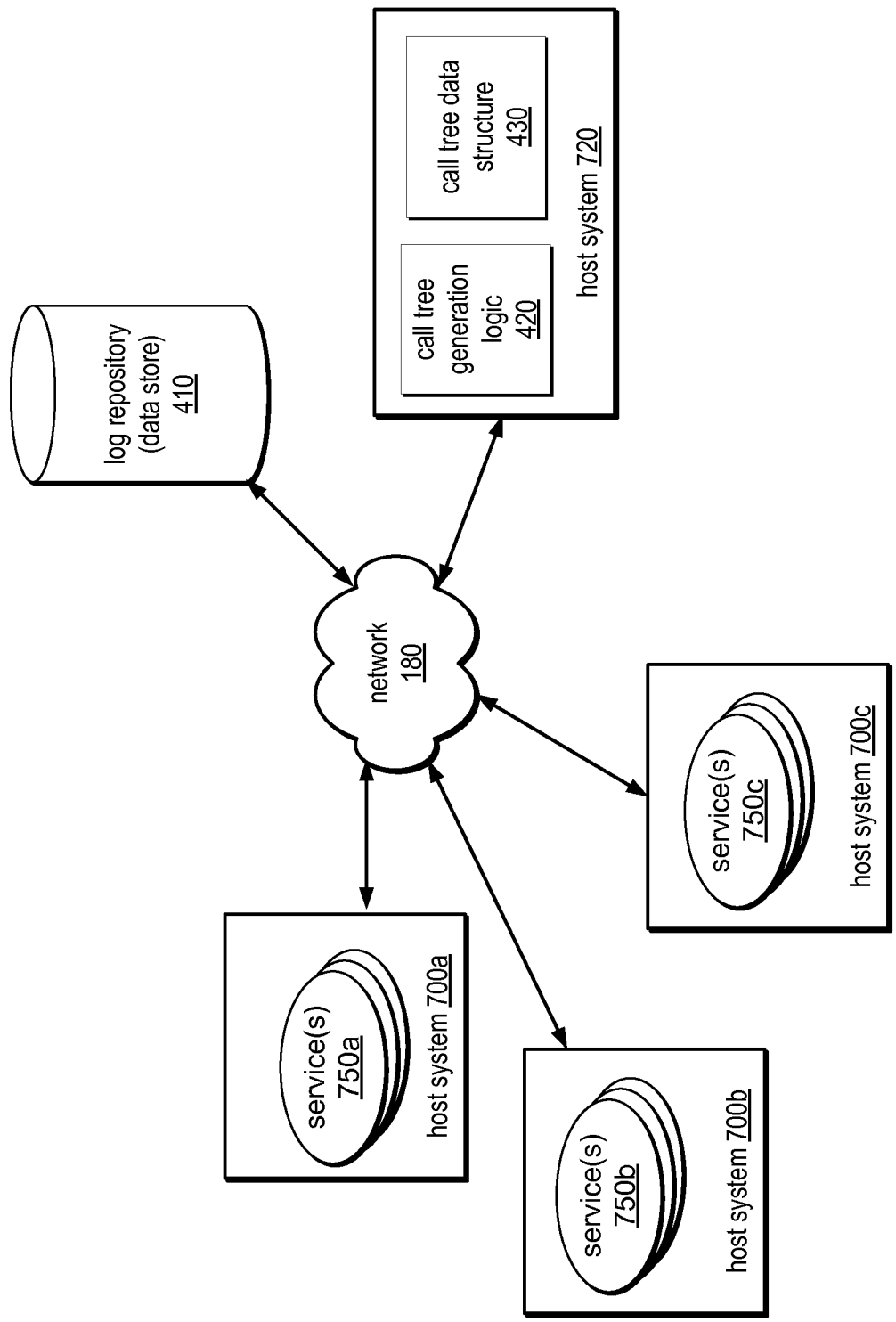
FIG. 7 illustrates an example system configuration, according to some embodiments.

The system and method for tracking service requests may include various system configurations, according to various embodiments. One example system configuration is illustrated in FIG. 7. As illustrated the various components of the example system are coupled together via a network 180. Network 180 may include any combination of local area networks (LANs), wide area networks (WANs), some other network configured to communicate data to/from computer systems, or some combination thereof. Each of host systems 700*a-c* and 720 may be implemented by a computer system, such as computer system 800 described below. Call tree generation logic 420 may be implemented as software (e.g., program instructions executable by a processor of host system 720), hardware or some combination thereof. Call tree data structure 430 may be generated by host system logic 420 and stored in a memory of host system 720. Log repository 410 may be implemented as a data store (e.g., database, memory, or some other element configured to store data) coupled to network 180. In other embodiments, log repository 410 may be implemented as a backend system of host system 720 and accessible to host system 720 via a separate network. Host system 700*a* may be configured to execute program instruction to implements one or more services 750*a*. Such services may include but are not limited to one or more of network-based services (e.g., a web service), applications, functions, objects, methods (e.g., objected-oriented methods), subroutines, or any other set of computer-executable instructions. Examples of services 750 include any of the services described above. Host systems 700*b-c* and services 750*b-c* may be configured in a similar manner.

In various embodiments, the various services of the illustrated embodiment may be controlled by a common entity. However, in some embodiments, external systems, such as a system controlled by another entity, may be called as part of a sequence of requests for fulfilling a root request. In some cases, the external system may adhere to the request identifier generation techniques described herein and may integrate with the various services described above. In the event that an external system does not adhere to the various techniques for generating request identifiers as described herein, the external system may be treated as a service that is not visible in the call tree or, alternatively, requests sent back from the external system may be treated as new requests altogether (e.g., as root requests). In various embodiments, the system configuration may include one or more proxy systems and/or load balancing systems. In some cases, the system configuration may treat these systems as transparent from a request identifier generation perspective. In other cases, these systems may generate request identifiers according to the techniques described above.

In some embodiments, the service-oriented system described herein may be integrated with other external systems that may utilize different techniques for identifying requests. For instance, the request identifiers described herein may in various embodiments be wrapped or enveloped in additional data (e.g., additional identifiers, headers, etc.) to facilitate compatibility with various external systems.

Example System

Various embodiments of a system and method for tracking service requests, as described herein, may be executed on one or more computer systems, which may interact with various other devices. One such computer system is computer system 900 illustrated by FIG. 8, which in the illustrated example may implement host system 720. Computer system 900 may be capable of implementing call tree generation logic, such as call tree generation logic 420. In the illustrated embodiment, computer system 900 includes one or more processors 910 coupled to a system memory 920 via an input/output (I/O) interface 930. Computer system 900 further includes a network interface 940 coupled to I/O interface 930, and one or more input/output devices 950, such as cursor control device 960, keyboard 970, and display(s) 980. In some embodiments, it is contemplated that embodiments may be implemented using a single instance of computer system 900, while in other embodiments multiple such systems, or multiple nodes making up computer system 900, may be configured to host different portions or instances of embodiments. For example, in one embodiment some elements may be implemented via one or more nodes of computer system 900 that are distinct from those nodes implementing other elements.

In various embodiments, computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store program instructions 922 and/or data 932 accessible by processor 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing call tree generation logic, such as call tree generation logic 420 described above, are shown stored within system memory 920 as call tree generation logic 420. Additionally, a call tree data structure 430 (which may be generated by logic 420) may be stored with data 932 of memory 920. In other embodiments, program instructions and/or data may be received, sent or stored upon different types of computer-accessible media or on similar media separate from system memory 920 or computer system 900. Generally speaking, a computer-accessible medium may include storage media or memory media such as magnetic or optical media, e.g., disk or CD/DVD-ROM coupled to computer system 900 via I/O interface 930. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 940.

In one embodiment, I/O interface 930 may be configured to coordinate I/O traffic between processor 910, system memory 920, and any peripheral devices in the device, including network interface 940 or other peripheral interfaces, such as input/output devices 950. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network (e.g., network 180), such as log repository 410 and/or host system 700a and service(s) 750a, or between nodes of computer system 900. In various embodiments, network interface 940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 950 may, in some embodiments, include one or more display terminals, keyboards, keypads, touchpads, scanning devices, voice or optical recognition devices, or any other devices suitable for entering or accessing data by one or more computer systems 900. Multiple input/output devices 950 may be present in computer system 900 or may be distributed on various nodes of computer system 900. In some embodiments, similar input/output devices may be separate from computer system 900 and may interact with one or more nodes of computer system 900 through a wired or wireless connection, such as over network interface 940.

Figure 8:
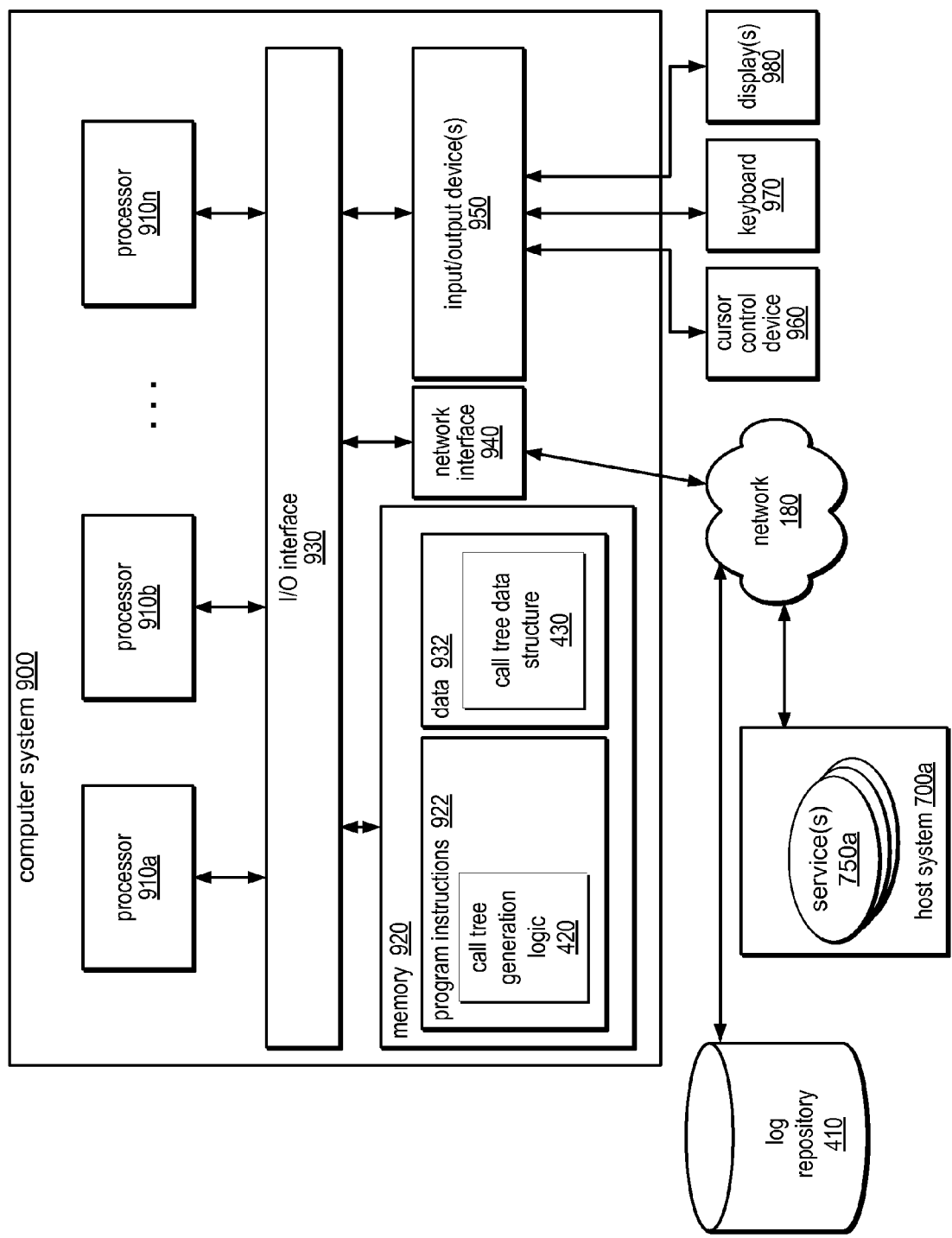
FIG. 8 illustrates one example of a system for implementing call tree generation logic, according to some embodiments.

As shown in FIG. 8, memory 920 may include program instructions 922 configured to implement call tree generation logic, such as call tree generation logic 420. In one embodiment, call tree generation logic 420 may implement the methods described above, such as the method illustrated by FIGS. 6A-6B. In other embodiments, different elements and data may be included. As illustrated, note that data 932 may include call tree data structure 430.

Those skilled in the art will appreciate that computer system 900 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, various embodiments may be practiced with other computer system configurations.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A computer-implemented method for tracking service requests within a service-oriented system comprising a plurality of services, the method comprising:

performing, by one or more computers comprising one or more processors and memory:

receiving multiple request identifiers each associated with a respective one of a plurality of service requests, wherein each given request identifier includes an origin identifier associated with a root request, a depth value specifying a location of the associated service request within a sequence of service requests, and a request stack comprising one or more interaction identifiers each assigned to a service request issued from one service to another service;

based on multiple ones of said request identifiers that each include an origin identifier associated with a particular root request, generating a data structure that specifies a hierarchy of services called to fulfill that particular root request; wherein, based on one or more of said interaction identifiers and one or more of said depth values, the generated data structure specifies for each of multiple services of said hierarchy: a particular service, a parent service that called the particular service, and one or more child services called by the particular service;

for a given request identifier of said multiple request identifiers, determining one or more timestamps indicating one or more of: a time at which the corresponding request was received by the associated service of said plurality of services and a time at which the corresponding request was sent by a service that issued the corresponding request; and for each of a plurality services of said hierarchy, indicating latency information associated with transmission of one or more service requests of said hierarchy within the data structure, wherein said latency information is based on one or more of said timestamps.

2. The method of claim 1, wherein said generating comprises:

determining that each of a subset of said multiple request identifiers comprises the same origin identifier, and indicating each associated service request as a node of said hierarchy within said data structure;

for each node within said hierarchy, assigning the node to a level within the hierarchy based on the depth value of the request identifier associated with the service request corresponding to that node;

in response to determining that the request stack of a given node at a given level within said hierarchy includes an interaction identifier that is the same as an interaction identifier of the request stack of an other node located within an adjacent level of the hierarchy, indicating a service call as an edge between said given node and said other node.

3. The method of claim 1, wherein the method comprises, determining that a first service issued a particular service request to a second service, wherein that determination is based on a request stack of a request identifier associated with an other service request issued by the second service and not based on a request identifier associated with the particular service request.

4. The method of claim 1, further comprising constraining the size of the request stack of at least some of the request identifiers to a particular quantity of interaction identifiers.

5. The method of claim 4, further comprising determining said particular quantity of interaction identifiers based on one or more of: bandwidth requirements, storage requirements and fault tolerance requirements.

6. The method of claim 1, further comprising appending one or more of said timestamps as metadata to one or more services of the hierarchy within the data structure.

7. The method of claim 1, further comprising determining error information indicating one or more errors associated with processing a given request and appending said error information to the hierarchy as metadata within the data structure.

8. The method of claim 1, further comprising determining task information indicating one or more completed tasks associated with processing a given request and appending said task information to the hierarchy as metadata within the data structure.

9. A system, comprising:

a memory comprising program instructions; and one or more processors coupled to said memory, wherein the program instructions are executable by at least one of said one or more processors to:

receive multiple request identifiers each associated with a respective one of a plurality of service requests, wherein each given request identifier includes an origin identifier associated with a root request, a depth value specifying a location of the associated service request within a sequence of service requests, and a request stack comprising one or more interaction identifiers each assigned to a service request issued from one service to another service;

based on multiple ones of said request identifiers that each include an origin identifier associated with a particular root request, generate a data structure that specifies a hierarchy of services called to fulfill that particular root request; wherein, based on one or more of said interaction identifiers and one or more of said depth values, the generated data structure specifies for each of multiple services of said hierarchy: a particular service, a parent service that called the particular service, and one or more child services called by the particular service;

for a given request identifier of said multiple request identifiers, determine one or more timestamps indicating one or more of: a time at which the corresponding request was received by the associated service of said plurality of services and a time at which the corresponding request was sent by a service that issued the corresponding request; and for each of a plurality services of said hierarchy, indicate latency information associated with transmission of one or more service requests of said hierarchy within the data structure, wherein said latency information is based on one or more of said timestamps.

10. The system of claim 9, wherein to generate the data structure, the program instructions are configured to:

determine that each of a subset of said multiple request identifiers comprises the same origin identifier, and indicate each associated service request as a node of said hierarchy within said data structure;

for each node within said hierarchy, assign the node to a level within the hierarchy based on the depth value of the request identifier associated with the service request corresponding to that node;

in response to determining that the request stack of a given node at a given level within said hierarchy includes an interaction identifier that is the same as an interaction identifier of the request stack of an other node located within an adjacent level of the hierarchy, indicate a service call as an edge between said given node and said other node.

11. The system of claim 9, wherein the program instructions are configured to determine that a first service issued a particular service request to a second service, wherein that determination is based on a request stack of a request identifier associated with an other service request issued by the second service and not based on a request identifier associated with the particular service request.

12. The system of claim 9, wherein the program instructions are configured to constrain the size of the request stack of at least some of the request identifiers to a particular quantity of interaction identifiers.

13. The system of claim 12, wherein the program instructions are configured to determine said particular quantity of interaction identifiers based on one or more of: bandwidth requirements, storage requirements and fault tolerance requirements.

14. The system of claim 9, wherein the program instructions are configured to append one or more of said timestamps as metadata to one or more services of the hierarchy within the data structure.

15. The system of claim 9, wherein the program instructions are configured to determine error information indicating one or more errors associated with processing a given request and append said error information to the hierarchy as metadata within the data structure.

16. The system of claim 9, wherein the program instructions are configured to determine task information indicating one or more completed tasks associated with processing a given request and append said task information to the hierarchy as metadata within the data structure.

17. A non-transitory computer-readable storage medium storing program instructions computer-executable to:

receive multiple request identifiers each associated with a respective one of a plurality of service requests, wherein each given request identifier includes an origin identifier associated with a root request, a depth value specifying a location of the associated service request within a sequence of service requests, and a request stack comprising one or more interaction identifiers each assigned to a service request issued from one service to another service;

based on multiple ones of said request identifiers that each include an origin identifier associated with a particular root request, generate a data structure that specifies a hierarchy of services called to fulfill that particular root request; wherein, based on one or more of said interaction identifiers and one or more of said depth values, the generated data structure specifies for each of multiple services of said hierarchy: a particular service, a parent service that called the particular service, and one or more child services called by the particular service;

determine a particular quantity of interaction identifiers based on one or more of: bandwidth requirements, storage requirements and fault tolerance requirements; and constrain the size of the request stack of at least some of the request identifiers to the particular quantity of interaction identifiers.

18. The non-transitory computer-readable storage medium of claim 17, wherein to generate the data structure, the program instructions are configured to:

determine that each of a subset of said multiple request identifiers comprises the same origin identifier, and indicate each associated service request as a node of said hierarchy within said data structure;

for each node within said hierarchy, assign the node to a level within the hierarchy based on the depth value of the request identifier associated with the service request corresponding to that node;

in response to determining that the request stack of a given node at a given level within said hierarchy includes an interaction identifier that is the same as an interaction identifier of the request stack of an other node located within an adjacent level of the hierarchy, indicate a service call as an edge between said given node and said other node.

19. The non-transitory computer-readable storage medium of claim 17, wherein the program instructions are configured to determine that a first service issued a particular service request to a second service, wherein that determination is based on a request stack of a request identifier associated with an other service request issued by the second service and not based on a request identifier associated with the particular service request.

20. The non-transitory computer-readable storage medium of claim 17, wherein the program instructions are configured to, for a given request identifier of said multiple request identifiers, determine one or more timestamps indicating one or more of: a time at which the corresponding request was received by the associated service of said plurality of services and a time at which the corresponding request was sent by a service that issued the corresponding request.

21. The non-transitory computer-readable storage medium of claim 20, wherein the program instructions are configured to, for each of a plurality services of said hierarchy, indicate latency information associated with transmission of one or more service requests of said hierarchy within the data structure, wherein said latency information is based on one or more of said timestamps.

22. The non-transitory computer-readable storage medium of claim 20, wherein the program instructions are configured to append one or more of said timestamps as metadata to one or more services of the hierarchy within the data structure.

23. The non-transitory computer-readable storage medium of claim 17, wherein the program instructions are configured to determine error information indicating one or more errors associated with processing a given request and append said error information to the hierarchy as metadata within the data structure.

24. The non-transitory computer-readable storage medium of claim 17, wherein the program instructions are configured to determine task information indicating one or more completed tasks associated with processing a given request and append said task information to the hierarchy as metadata within the data structure.

* * * * *